C. A. PIPENHAGEN.
RADIATOR SHUTTER.
APPLICATION FILED DEC. 26, 1918.
1,336,978.
Patented Apr. 13, 1920.
2 SHEETS-SHEET 2.
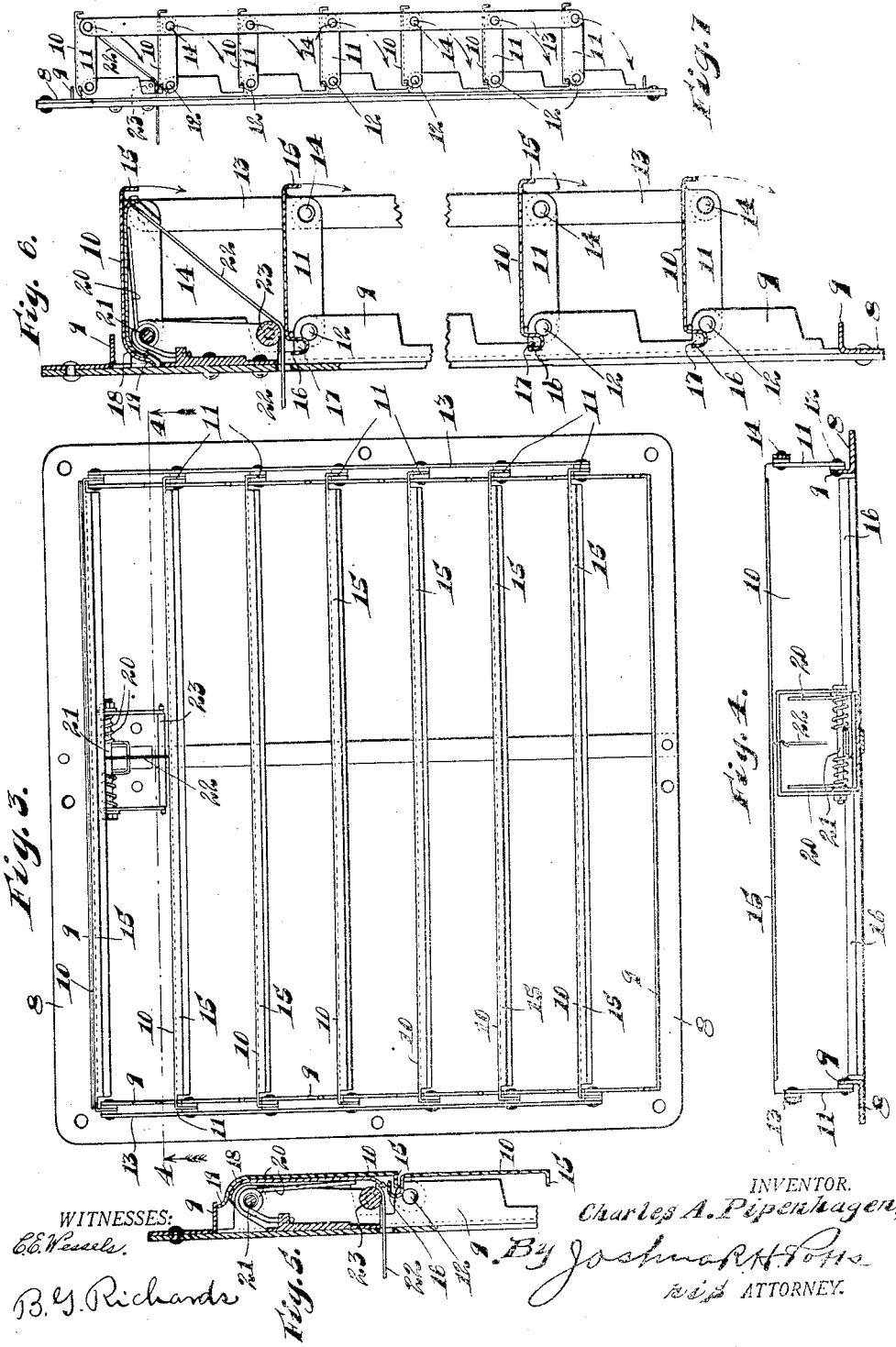
INVENTOR.
Charles A. Pipenhagen,
By Joshua R H Potts
his ATTORNEY.
WITNESSES:
C. E. Wessels.
B. G. Richards

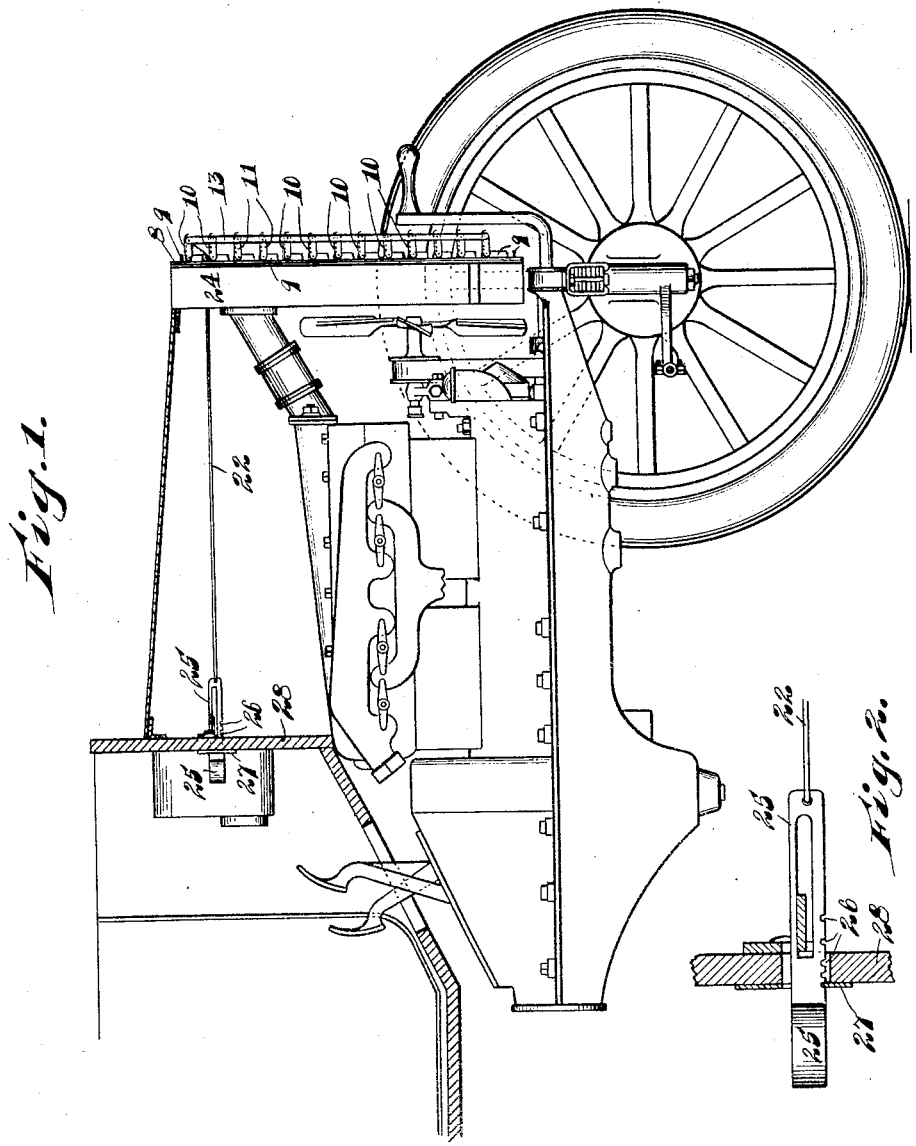

UNITED STATES PATENT OFFICE.

CHARLES A. PIPENHAGEN, OF CHICAGO, ILLINOIS.

RADIATOR-SHUTTER.

1,336,978.

Specification of Letters Patent. Patented Apr. 13, 1920.

Application filed December 26, 1918. Serial No. 268,308.

*To all whom it may concern:*

Be it known that I, CHARLES A. PIPEN-HAGEN, a citizen of the United States, and a resident of the city of Chicago, county of Cook, and State of Illinois, have invented certain new and useful Improvements in Radiator-Shutters, of which the following is a specification.

My invention relates to improvements in radiator shutters especially adapted for use on automobiles, and has for its object the provision of an improved construction of this character which is simple and effective in use, and capable of economical manufacture.

Other objects will appear hereinafter.

The invention consists in the combinations and arrangements of parts hereinafter described and claimed.

The invention will be best understood by reference to the accompanying drawings forming a part of this specification, and in which, Figure 1, is a side view, shown partially in section, of the hood of an automobile equipped with a radiator shutter embodying the invention, Fig. 2, an enlarged detail section illustrating means employed for operating the shutter, Fig. 3, a front view of the shutter in open position, Fig. 4, a horizontal section taken on line 4—4 of Fig. 3, Fig. 5, an enlarged detail vertical section taken through the upper portion of the shutter, Fig. 6, an enlarged partial vertical section of the shutter shown in open position, and Fig. 7, a side view, on a reduced scale, of a shutter in open position.

The preferred form of construction, as illustrated in the drawings, comprises a suitable sheet metal frame 8 adapted to be secured to the front of the radiator of an automobile and provided with flanges 9 around the edges of the opening in said frame. The opening in the frame 8 is arranged to be closed by means of a plurality of shutter slats 10, each of said slats consisting of a strip of sheet metal somewhat longer than the width of the opening in frame 8 and having inwardly turned ends or flanges 11 pivoted at 12 to the flanges 9 at the sides of frame 8. The inwardly turned ends or flanges 11 of the slats 10 are pivotally connected with reinforcing links or bars 13 by means of loose rivets 14, whereby simultaneous operation of said shutters is insured and the same are greatly reinforced. Each of the slats 10 is provided at its free or swinging edge with an inwardly extending lip or flange 15, and the lower slats are provided with outwardly turned lips 16 at their pivoted edges, forming spaces 17 adapted to receive lips 15 on the adjacent upper slats, thus effecting a perfect air seal at this point when the slats are closed, as indicated in Fig. 5. The uppermost slat 10 is provided at its inner pivoted edge with a rounded portion 18 adapted to shed the rain when the shutter is closed and a lip 19 contacting with the adjoining flange 9 to effect a perfect seal when the shutter is closed. The lip 15 on the lowermost slat 10 engages over the flange 9 at the lower edge of frame 8 when the shutter is closed, to form a perfect seal at this point. Ends or flanges 11 also fit over the side flanges 9, thus effecting a tight seal against the passage of air at all points when the shutter is closed.

The shutter is normally held in open position by means of a coiled spring 20 mounted on a bolt 21 on the inner side of the uppermost shutter 10, as shown. A flexible cable 22 is connected with the free or swinging edge of the uppermost shutter 10, is led thence over a guide roller 23, through the radiator 24 of the automobile and thence through the hood of the automobile to a slotted bar 25. Bar 25 is provided on its lower edge with notches 26 adapted to engage a stop plate 27 mounted on the inner side of the dashboard 28 of the automobile, said bar 25 sliding freely through said dashboard and said notches serving to lock the shutter in various positions of adjustment or completely closed, as desired.

By this arrangement it will be observed that the shutter may be readily closed by simply pulling upon the bar 25 and locking said bar in any desired position of adjustment. The shutter is opened merely by releasing said bar. The specific form and arrangement of parts is a simple and efficient one for the purpose, having great strength and durability in use, and capable of economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. In a shutter device for automobile radiators, the combination of a frame, a series of shutters pivotally mounted in said frame, means connecting all of said shutters to operate in unison, a rod traversing said frame under one of said shutters, a coiled spring mounted on said rod and connected with a corresponding shutter to hold said shutters normally open, and means for closing said shutters.

2. In a shutter device for automobile radiators, the combination of a frame, a series of horizontal shutters having their ends pivotally mounted in said frame, a rod traversing said frame under the uppermost of said shutters co-axially with the pivots thereof, a coiled spring mounted on said rod and bearing against the uppermost shutter arranged to hold said shutters normally open, and means for closing said shutters.

3. In a shutter device for automobile radiators, the combination of a frame, a series of shutters in which the upper edge of the top shutter is formed on a radius substantially on an axis with its bearings, an operating spring concealed thereunder, means for connecting all the shutters to operate in unison, and means for closing all the shutters or holding them in intermediate positions.

4. A shutter device for automobile radiators, the combination of a series of shutters, and strips to operate them in unison, a spring attached coaxially with the end bearings under the top shutter to hold all the shutters open, and means for closing the shutters or holding them in intermediate positions.

5. A shutter device for automobile radiators, the combination of a frame, a series of shutters connected to operate in unison, a spring concealed under the top shutter to hold all the shutters open, a flexible connection to one of the shutters to close all the shutters.

In testimony whereof I have signed my name to this specification in the presence of two subscribing witnesses.

CHARLES A. PIPENHAGEN.

Witnesses:
JOSHUA R. H. POTTS,
HELEN F. LILLIS.